United States Patent [19]
Kojima

[11] Patent Number: 6,104,173
[45] Date of Patent: Aug. 15, 2000

[54] DC-DC CONVERTER AND POWER-SUPPLY SWITCHING CIRCUIT

[75] Inventor: Shinichi Kojima, Kanagawa, Japan

[73] Assignee: Ricoh Company, Ltd., Tokyo, Japan

[21] Appl. No.: 09/362,626

[22] Filed: Jul. 20, 1999

[30] Foreign Application Priority Data

Jul. 22, 1998 [JP] Japan .................................. 10-205977

[51] Int. Cl.⁷ .................................................. G05F 1/10
[52] U.S. Cl. .......................................... 323/222; 323/901
[58] Field of Search .................................. 323/901, 222, 323/284; 363/49

[56] References Cited

U.S. PATENT DOCUMENTS

| | | | |
|---|---|---|---|
| 4,370,701 | 1/1983 | Western | 363/49 |
| 5,142,218 | 8/1992 | Palara et al. | 323/901 |
| 5,581,453 | 12/1996 | Ueta et al. | 363/49 |
| 5,880,942 | 3/1999 | Leu | 363/49 |

*Primary Examiner*—Shawn Riley
*Attorney, Agent, or Firm*—Cooper & Dunham LLP

[57] ABSTRACT

A power-supply switching portion compares an input voltage and an output voltage, after a boost converter circuit is started. Before a step-up operation is started, that is, in a condition in which the input voltage is higher than the output voltage, the power-supply switching portion provides, via a first MOSFET, the input voltage to a power-supply line. The power-supply line supplies operation power for the boost converter circuit. After the step-up operation is started, that is, in a condition in which the output voltage is equal to or higher than the input voltage, the power-supply switching portion provides, via a second MOSFET, the output voltage, instead of the input voltage, to the power-supply line.

14 Claims, 5 Drawing Sheets

DC-DC CONVERTER AND POWER-SUPPLY SWITCHING CIRCUIT

BACKGROUND OF THE INVENTION

1. Field of the Invention

The present invention relates to a semiconductor device, in particular, to a boost-type DC-DC converter which is provided with a boost converter circuit for increasing an input voltage to a predetermined voltage and outputting the predetermined voltage.

2. Description of the Prior Art

As such a type of a DC-DC converter (switching power-supply circuit) in the prior art, there is one disclosed in Japanese Laid-Open Utility Model Application No. 6-60291 (see FIG. 1).

In a switching power-supply circuit shown in FIG. 1, a capacitor C3 is connected between an input terminal 1 and a power-source-voltage terminal Vcc of a control circuit 3 which drives a switching element (transistor) Q1. When the switching power-supply circuit is started, a DC power is supplied to the switching power-supply circuit externally, and the power is supplied to the control circuit 3 via the capacitor C3.

Further, a capacitor C1 is connected between the input terminal 1, which is connected to an external DC power source, and ground. Furthermore, the input terminal 1 is connected to an end of a primary winding N1 of a transformer T. The other end of the primary winding N1 of the transformer T is connected to the ground via the drain and source terminals of the MOSFET-type switching transistor Q1. The gate of the switching transistor Q1 is connected to the output terminal of the control circuit 3.

The capacitor C3 and a diode D2 are connected in parallel between the power-source-voltage terminal Vcc of the control circuit 3 and the input terminal 1, and the GND terminal of the control circuit 3 is connected to the ground. The anode of the diode D2 is connected to the input terminal 1 and the cathode of the diode D2 is connected to the control circuit 3. One end of a secondary winding N2 of the transformer T is connected to the anode of a diode D1, and the other end of this winding N2 is connected to the ground. The cathode of the diode D1 is connected to an output terminal 2. A smoothing capacitor C2 is connected between the output terminal 2 (output voltage $V_O$) and the ground. Further, in parallel to the smoothing capacitor C2, a series circuit of resistors R1 and R2 is connected. The connection point between the resistors R1 and R2 is connected to the control circuit 3. Thereby, the output voltage is divided by the resistors R1 and R2, and the thus-obtained voltage is input to the control circuit 3.

One end of a tertiary winding N3 of the transformer T is connected to the ground, and the other end of this winding N3 is connected to the anode of the diode D3. The polarity of the end of the primary winding N1 of the transformer T on the switching-transistor-Q1-drain side is the same as the polarity of the end of the secondary winding N2 of the transformer T on the diode-D1-anode side. The cathode of the diode D3 is connected to the power-source-voltage terminal Vcc of the control circuit 3.

In the switching power-supply circuit, the power-source voltage for driving is provided to the control circuit 3. At the time of starting of the switching power-supply circuit, when the input voltage $V_{IN}$ is applied to the input terminal 1 by the external DC power source, a current $i_{C3}$ instantly flows in a path from the input terminal 1, through the capacitor C3, through the control circuit 3 and to the ground, and, thereby, the capacitor C3 is charged. Due to the property of capacitors, in a condition in which the capacitor C3 was not previously charged, immediately after the input voltage $V_{IN}$ is applied, the electric potential difference between the ends of the capacitor C3 is zero. Then, an increasing electric potential difference between the ends of the capacitor C3 develops by the charging current $i_{C3}$ as time elapses. Thereby, immediately after the input voltage VIN is applied, a voltage approximately equal to the input voltage $V_{IN}$ is provided to the power-source-voltage terminal Vcc of the control circuit 3.

The control circuit 3 is started by this input voltage $V_{IN}$, and a pulse voltage having an amplitude approximately the same as the voltage $V_{IN}$ is applied to the gate of the switching transistor Q1. Thereby, the switching transistor Q1 operates, and the switching power-supply circuit starts operating. Therefore, it is possible to set the voltage value of the necessary lowest input voltage $V_{IN}$ by which the switching power-supply circuit can be started to a value approximately near to the threshold value ($V_{TH}$) of the switching transistor Q1. Therefore, in comparison to a conventional circuit, it is possible to set the voltage value of the necessary lowest input voltage $V_{IN}$ to a lower value.

When the switching power supply circuit starts operating, a voltage is induced in the secondary winding N2 of the transformer T, DC power is supplied to a load, and, simultaneously, a voltage $V_3$ is also induced in the tertiary winding N3 of the transformer T. When the voltage $V_3$ is in a relationship such that $(V_3-V_{F3})>(V_{IN}-V_{F2})$ wherein $V_{F2}$ stands for the forward-direction dropping voltage of the diode D2 and $V_{F3}$ stands for the forward-direction dropping voltage of the diode D3, the voltage $V_3$ induced in the tertiary winding N3 of the transformer T is rectified by the diode D3 (the forward-direction dropping voltage: $V_{F3}$), then, is smoothed by the capacitors C3 and C1, and is input to the power-source-voltage terminal Vcc as an output voltage Vs ($=V_3-V_{F3}$) of an auxiliary power-source circuit 4.

Thereby, power (voltage=$V_3-V_{F3}$) is supplied to the control circuit 3 from the auxiliary power-source circuit 4. The voltage value of this voltage Vs is higher than the input voltage $V_{IN}$. Therefore, a voltage higher than the voltage at the time of starting is applied to the gate of the switching transistor Q1, which is driven thereby. Thereby, the ON resistance of the switching transistor Q1 is smaller than that at the starting. As a result, in a steady operation after the starting, the power consumption in the switching transistor Q1 is smaller than that at the starting.

When the input voltage $V_{IN}$ increases and there is a relationship such as $(V_{IN}-V_{F2})>(V_3-V_{F3})$, power of the input voltage $V_{IN}$ from the external DC power source is supplied to the control circuit 3. Thus, the higher voltage between $V_{IN}$ and $V_3$ is automatically selected as the driving power source for the control circuit 3.

In this switching power-supply circuit in the prior art, as described above, when the voltage $V_3$ is in the relationship such as $(V_3-V_{F3})>(V_{IN} V_{F2})$, the voltage $V_3$ induced in the tertiary winding N3 of the transformer T is rectified by the diode D3, and, then, is smoothed by the capacitors C3 and C1. Thus, the voltage having the magnitude of $V_3-V_{F3}$ is input to the power-source-voltage terminal Vcc as the output voltage Vs of the auxiliary power-source circuit 4. When there is the relationship such as $(V_{IN}-V_{F2})>(V_3-V_{F3})$ before the step-up (boost) operation, because the relationship such as $(V_{IN} V_{F2})>(V_3-V_{F3})$ holds, the voltage $V_{IN}-V_{F2}$ which is smaller than the input voltage $V_{IN}$ from the external DC power source by $V_{F2}$ is provided to the control circuit 3.

However, in the switching power-supply circuit, in order to lower the power-source voltage, it is necessary to lower the necessary lowest operation voltage of the control circuit 3 because the voltage provided to the power-source-voltage terminal Vcc is lower than the input voltage $V_{IN}$ by $V_{F2}$. However, because the operation-possible lowest voltage of the MOS transistors constituting the control circuit 3 is limited, it is not possible to lower the necessary lowest operation voltage of the control circuit 3 without limit. Therefore, in order to lower the power-source voltage, it is desired to omit the voltage drop developing through the forward-direction dropping voltage of the diode. However, in the switching power-supply circuit in the prior art, it is difficult to omit the voltage drop developing through the forward-direction dropping voltage of the diode.

SUMMARY OF THE INVENTION

The present invention is directed to solving this problem in the prior art, and, in particular, an object of the present invention is to avoid the case in which the power-supply voltage for the boost converter circuit, before the step-up operation is performed, is the voltage lower than the power-source voltage by the voltage drop equal to the forward-direction dropping voltage of the diode, and to reduce the necessary boost-operation starting voltage.

A DC-DC converter according to the present

According to an embodiment of the present invention, a DC-DC converter is provided with a boost converter circuit, which is used for increasing an input voltage to a predetermined voltage and outputting the voltage. T he DC-DC converter includes a power-supply switching portion which compares the input voltage and an output voltage after the boost converter circuit is started, and, before a step-up operation is started, that is, in a condition in which the input voltage is higher than the output voltage, and provides, via a first MOSFET, the input voltage to a power-supply line which supplies operation power for said boost converter circuit so as to start said boost converter circuit. After the step-up operation is started, that is, in a condition in which the output voltage is equal to or higher than the input voltage, provides, via a second MOSFET, the output voltage, instead of the input voltage, to the power-supply line which supplies the operation power for the boost converter circuit so as to cause the step-up operation of the boost converter circuit to be continuously performed. Back-gate biasing means provides the higher voltage between the input voltage and the output voltage to a back gate of the first MOSFET and a back gate of the second MOSFET.

According to another embodiment, a power-supply switching circuit includes a comparator for comparing an input voltage to an output voltage and outputting a result of the comparison. A first MOSFET supplies the input voltage to a power-supply line when the result of the comparison indicates that the input voltage is greater than the output voltage. A second MOSFET supplies the output voltage to the power-supply line when the result of the comparison indicates that the output voltage is equal to or greater than the input voltage. A back-gate biasing circuit provides the input voltage or the output voltage, which ever is greater, to a back-gate of the first MOSFET and a back-gate of the second MOSFET.

DESCRIPTION OF THE PREFERRED EMBODIMENT

A DC-DC converter 10 in an embodiment of the present invention is one form of a power-supply IC, and is a boost-type DC-DC converter provided with a boost converter circuit 20 which is used for increasing a voltage (input voltage $V_{IN}$), input by an external power source such as a battery or the like, to a predetermined voltage and outputting this voltage (output voltage $V_{OUT}$). The DC-DC converter 10 has a function of comparing the input voltage $V_{IN}$ and the output voltage $V_{OUT}$ after the boost converter circuit 20 is started, and, before a step-up operation is started, that is, in a condition in which the input voltage $V_{IN}$ is higher than the output voltage $V_{OUT}$, providing the input voltage $V_{IN}$ to a power-supply line L which supplies operation power to the circuits in the DC-DC converter 10 including the boost converter circuit 20 so as to start the circuits in the DC-DC converter 10 including the boost converter circuit 20.

Furthermore, after the step-up operation is started, that is, in a condition in which the output voltage $V_{OUT}$ is equal to or higher than the input voltage $V_{IN}$, the DC-DC converter 10 provides the output voltage $V_{OUT}$, instead of the input voltage $V_{IN}$, to the power-supply line L which supplies the operation power to the circuits in the DC-DC converter 10 including the boost converter circuit 20 so as to cause the step-up operation of the boost converter circuit 20 and the operations of the circuits in the DC-DC converter 10 to be continuously performed.

Figure 2:
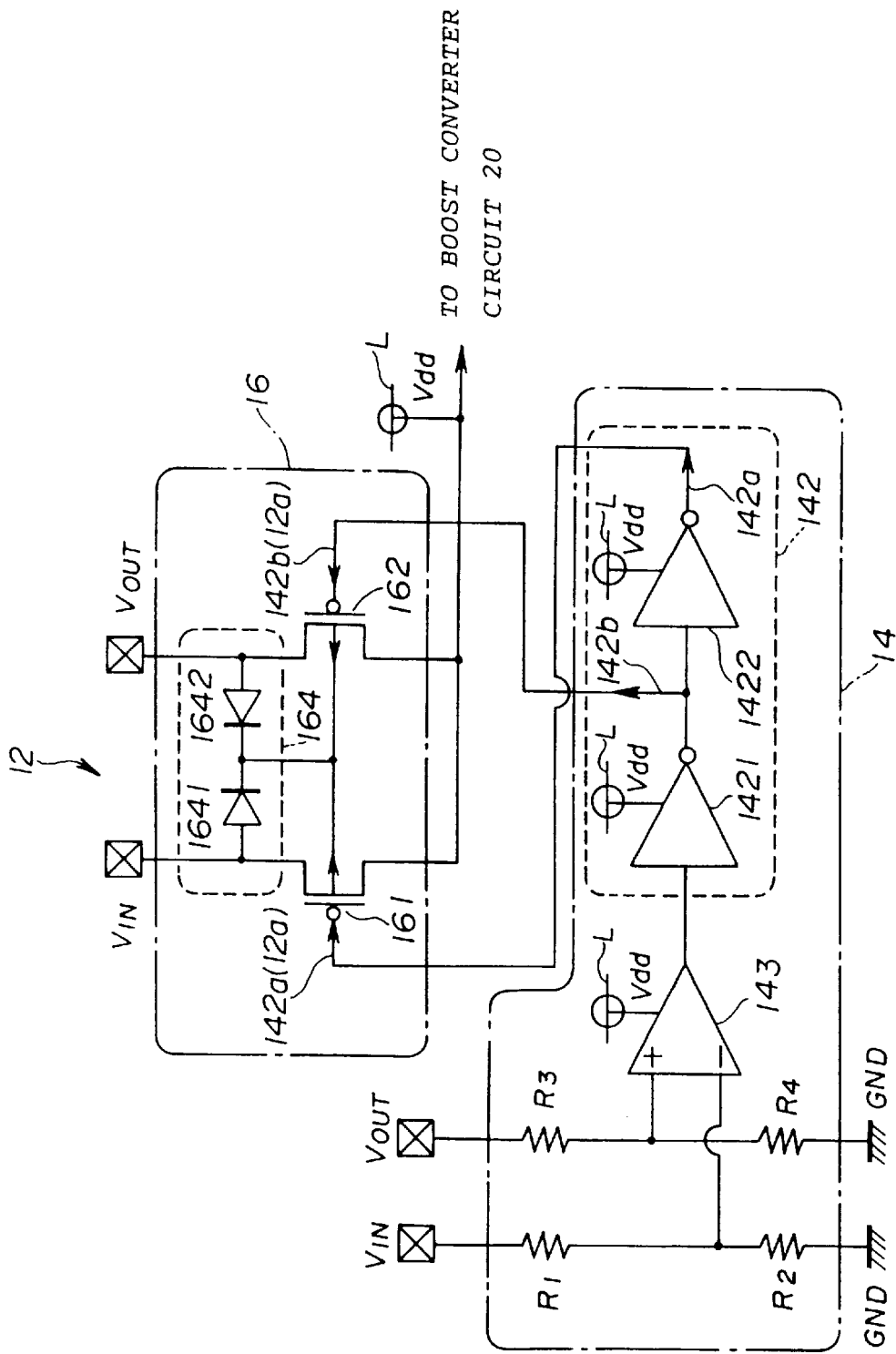
FIG. 2 shows a circuit diagram for illustrating one embodiment of a power-supply switching portion according to the present invention.

FIG. 2 shows a circuit diagram for illustrating one embodiment of a power-supply switching portion 12 according to the present invention.

The power-supply switching portion 12 which performs the above-described functions is integrated in the DC-DC converter 10, and, as shown in FIG. 2, has a hardware arrangement including a voltage comparing portion 14 and a power-supply-voltage switch 16.

The voltage comparing portion 14 is integrated in the DC-DC converter 10, and has a function of comparing the voltage values of the input voltage $V_{IN}$ and the output voltage $V_{OUT}$ after the boost converter circuit 20 is started, and outputting a switching signal 12a. As shown in FIG. 2, the voltage-comparing portion 14 has a hardware arrangement including a comparator 143, resistance elements $R_1$, $R_2$, $R_3$ and $R_4$ and a logic circuit 142.

The resistance elements $R_1$ and $R_2$ are integrated in the DC-DC converter 10, and are connected in series between a terminal to which the input voltage $V_{IN}$ is applied and a GND terminal having the ground electric potential GND. A divided voltage $(=V_{IN} \cdot R_2/(R_1+R_2))$ at the connection point between the resistance elements $R_1$ and $R_2$ is input to the minus (−) input terminal of the comparator 143.

The resistance elements $R_3$ and $R_4$ are integrated in the DC-DC converter 10, and are connected in series between a terminal to which the output voltage $V_{OUT}$ is applied and the GND terminal having the ground electric potential GND. A divided voltage ($=V_{OUT} \cdot R_4/(R_3+R_4)$) at the connection point between the resistance elements $R_3$ and $R_4$ is input to the plus (+) input terminal of the comparator 143. In this embodiment, setting is made such that the ratio ($=R_1/R_2$) of the resistance element $R_1$ to the resistance element $R_2$ is equal to the ratio ($=R_3/R_4$) of the resistance element $R_3$ $R_4$ to the resistance element $R_4$ (that is, $R_1/R_2=R_3/R_4$).

The comparator 143 is integrated in the DC-DC converter 10, and operation power is supplied to the comparator 143 from the power-supply line L. The comparator 143 compares the divided voltage ($V_{IN} \cdot R_2/(R_1+R_2)$) input to the minus (−) input terminal and the divided voltage ($V_{OUT \cdot R4}/(R_3+R_4)$) input to the plus (+) input terminal, and outputs the comparison result as a comparison logic-value signal.

Specifically, the comparator 143 outputs a logic value L as the comparison logic-value signal when the divided voltage ($V_{IN} \cdot R_2/(R_1+R_2)$) input to the minus (−) input terminal is higher than the divided voltage ($V_{OUT \cdot R4}/(R_3+R_4)$) input to the plus (+) input terminal. The comparator 143 outputs a logic value H as the comparison logic-value signal when the divided voltage ($V_{OUT} \cdot R_4/(R_3+R_4)$) input to the plus (+) input terminal is higher than the divided voltage ($V_{IN} \cdot R_2/(R_1+R_2)$) input to the minus (−) input terminal.

The logic circuit 142 is integrated in the DC-DC converter 10. The logic circuit 142 has the following function: When the input voltage $V_{IN}$ is higher than the output voltage $V_{OUT}$, the logic circuit 142 applies, to the gate of a first p-channel MOSFET 161, which will be described later, a first gate signal 142a having a signal level such as to activate the first p-channel MOSFET 161 as the switching signal 12a, and, also, applies, to the gate of a second p-channel MOSFET 162, which will be described later, a second gate signal 142b having a signal level such as to deactivate the second p-channel MOSFET 162 as the switching signal 12a. When the output voltage $V_{OUT}$ is higher than the input voltage $V_{IN}$, the logic circuit 142 applies, to the gate of the second p-channel MOSFET 162, the second gate signal 142b having a signal level such as to activate the second p-channel MOSFET 162 as the switching signal 12a, and, also, applies, to the gate of the first p-channel MOSFET 161, the first gate signal 142a having a signal level such as to deactivate the first p-channel MOSFET 161 as the switching signal 12a. As shown in FIG. 2, the logic circuit 142 has a hardware arrangement including two logic elements NOT 1421 and 1422, operation power being supplied to each of these elements from the power-supply line L.

The logic element 1421 is integrated in the DC-DC converter 10, logically inverts the comparison logic-value signal, thus generates the second gate signal 142b, and applies the second gate signal 142b to the gate of the above-mentioned second p-channel MOSFET 162 as the switching signal 12a. Hereinafter, the second gate signal 142b is referred to as a second gate logic signal 142b.

The logic element 1422 is integrated in the DC-DC converter 10, logically inverts the second gate logic signal 142b, thus generates the first gate signal 142a, and applies the first gate signal 142a to the gate of the above-mentioned first p-channel MOSFET 161 as the switching signal 12a. Hereinafter, the first gate signal 142a is referred to as a first gate logic signal 142a.

Thereby, when the input voltage $V_{IN}$ is higher than the output voltage $V_{OUT}$, the logic circuit 142 applies, to the gate of the first p-channel MOSFET 161, the first gate logic signal 142a having the signal level such as to activate the first p-channel MOSFET 161 as the switching signal 12a, and, also, applies, to the gate of the second p-channel MOSFET 162, the second gate signal 142b having the signal level such as to deactivate the second p-channel MOSFET 161 as the switching signal 12a. Further, a first Schottky barrier diode 1641, which will be described later, is activated, and, also, a second Schottky barrier diode 1642, which will also be described later, is deactivated. Thereby, the input voltage $V_{IN}$ is applied to the back gate of the first p-channel MOSFET 161 and the back gate of the second p-channel MOSFET 162.

Further, when the output voltage $V_{OUT}$ is higher than the input voltage $V_{IN}$, the logic circuit 142 applies, to the gate of the second p-channel MOSFET 162, the second gate logic signal 142b having the signal level such as to activate the second p-channel MOSFET 162 as the switching signal 12a, and, also, applies, to the gate of the first p-channel MOSFET 161, the first gate logic signal 142a having the signal level such as to deactivate the first p-channel MOSFET 161 as the switching signal 12a. Further, the second Schottky barrier diode 1642 is activated, and, also, the first Schottky barrier diode 1641 is deactivated. Thereby, the output voltage $V_{OUT}$ is applied to the back gate of the first p-channel MOSFET 161 and the back gate of the second p-channel MOSFET 162.

As a result, it is possible that the higher voltage between the input voltage $V_{IN}$ and the output voltage $V_{OUT}$ is applied to the back gate of the first p-channel MOSFET 161 and the back gate of the second p-channel MOSFET 162. Further, it is possible that the input voltage $V_{IN}$ is provided to the power-supply line L when the first p-channel MOSFET 161 is activated, and provision of the input voltage $V_{IN}$ to the power-supply line L is prevented when the first p-channel MOSFET 161 is deactivated. Also, it is possible that the output voltage $V_{OUT}$ is provided to the power-supply line L when the second p-channel MOSFET 162 is activated, and provision of the output voltage $V_{OUT}$ to the power-supply line L is prevented when the second p-channel MOSFET 162 is deactivated.

Thereby, before the step-up operation is started, the input voltage $V_{IN}$ is used as the power-supply voltage Vdd of the power-supply line L which supplies the operation power to the circuits in the DC-DC converter 10 including the boost converter circuit 20. After the step-up operation is started, the output voltage $V_{OUT}$ is used as the power-supply voltage Vdd of the power-supply line L.

Figure 3A:
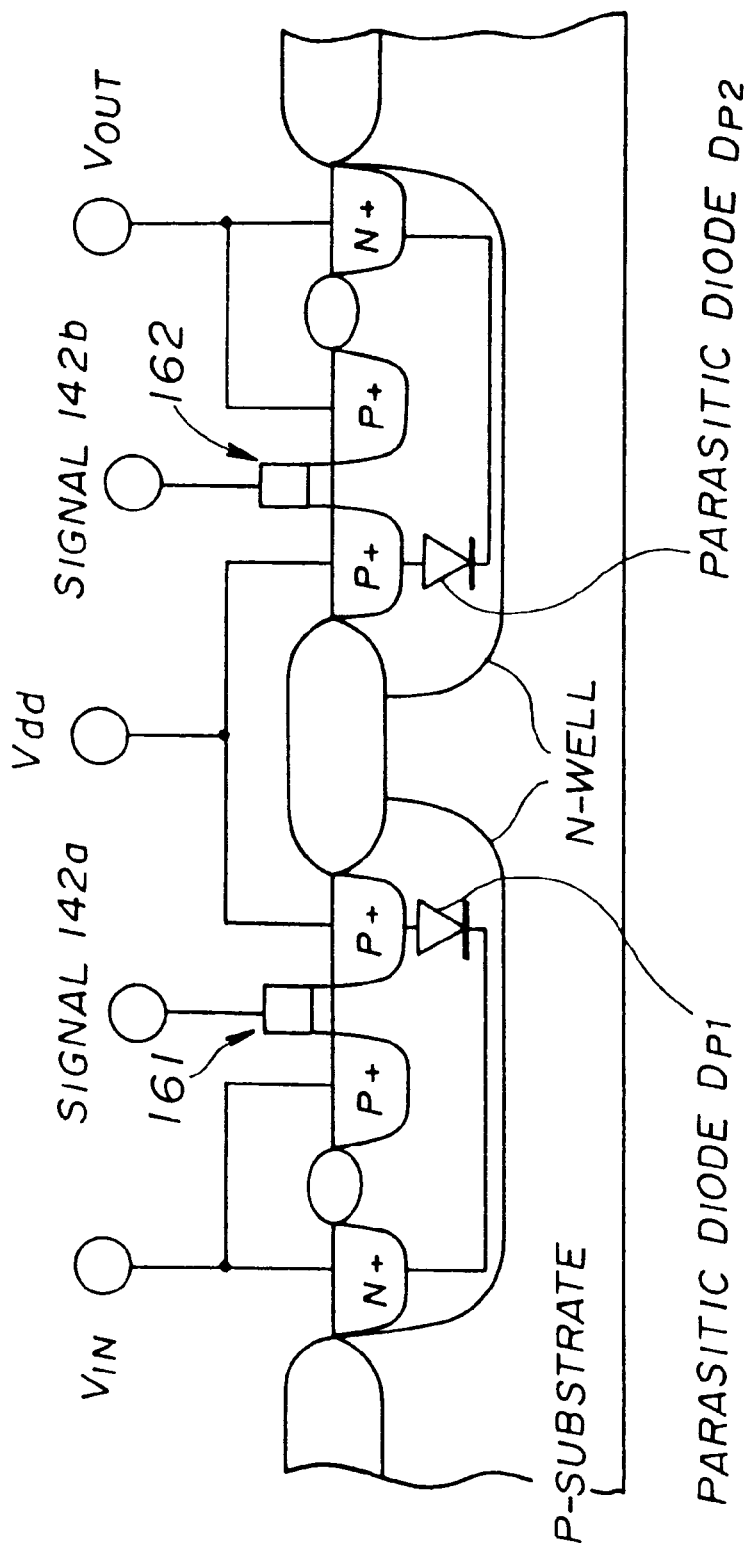
FIGS. 3A and 3B show sectional views of semiconductor devices for illustrating advantages obtained from providing diodes for applying back-gate voltages of MOSFETs.

The reason why it is advantageous that the higher voltage between the input voltage $V_{IN}$ and the output voltage $V_{OUT}$ is applied to the back gate of the first p-channel MOSFET 161 and the back gate of the second p-channel MOSFET 162 will now be described. It is assumed that the source voltage is applied to the back gate for each of the first p-channel MOSFET 161 and second p-channel MOSFET 162, as shown in FIG. 3A. When the output voltage $V_{OUT}$ is higher than the input voltage $V_{IN}$, the second p-channel MOSFET 162 is turned on. At this time, because the drain of the first p-channel MOSFET 161 (Vdd) is connected to the back gate of the first p-channel MOSFET 161 ($V_{IN}$) via a parasitic diode $D_{p1}$, as shown in FIG. 3A, an unexpected current flows in a path from the source of the second p-channel MOSFET 162 ($V_{OUT}$) to the back-gate of the first p-channel MOSFET 161 ($V_{IN}$) through the second p-channel MOSFET 162 and the first parasitic diode $D_{p1}$. Thus, when the step-up operation is performed and, thereby, the output voltage $V_{OUT}$ is higher than the input voltage $V_{IN}$, the useless current flows in the above-mentioned path. As a result, a useless power consumption develops, and, thereby, the efficiency of the DC-DC converter 10 is reduced.

When the input voltage $V_{IN}$ is higher than the output voltage $V_{OUT}$, the first p-channel MOSFET 161 is turned on. At this time, because the drain of the second p-channel MOSFET 162 (Vdd) is connected to the back gate of the second p-channel MOSFET 162 ($V_{OUT}$) via a parasitic diode $D_{p2}$, as shown in FIG. 3A, an unexpected current flows in a path from the source of the first p-channel MOSFET 161 ($V_{IN}$) to the back gate of the second p-channel MOSFET 161 ($V_{OUT}$) through the first p-channel MOSFET 161 and the second parasitic diode $D_{p2}$. As a result, when the value of this current is large, the voltage drop due to the ON resistance of the first p-channel MOSFET 161 may increase, and, thereby, the voltage Vdd of the power-supply line L may be decreased.

Figure 3B:
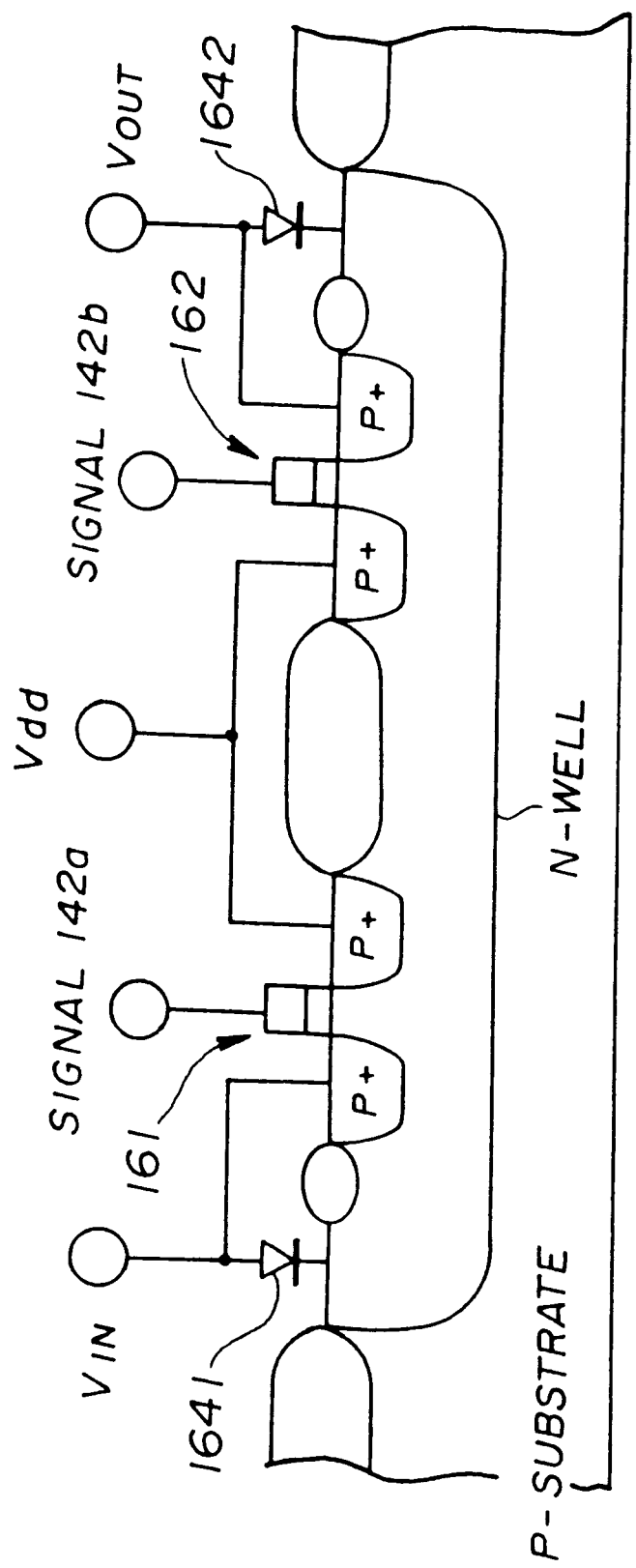

In order to prevent such phenomena, as shown in FIG. 3B, the source voltage is applied to the back gate via the diode for each of the first and second MOSFETs 161 and 162. Thereby, the parasitic diodes $D_{p1}$ and $D_{p2}$ can be prevented from being activated, and the above-mentioned useless currents can be prevented from flowing. Each of the diodes which are used for applying the back-gate voltages, respectively, can be produced as a result of causing the metal and the N-well to touch. The thus-produced diode is a Schottky barrier diode.

The power-supply-voltage switch 16 is integrated in the DC-DC converter 10, and has a function of, based on the switching signal 12a, providing the higher voltage between the input voltage $V_{IN}$ and the output voltage $V_{OUT}$ to the power-supply line L which supplies the operation power for the circuits in the DC-DC converter 10 including the boost converter circuit 20 so as to cause the step-up operation of the boost converter circuit 20 and the operations of the circuits in the DC-DC converter 10 to be performed. That is, when the input voltage $V_{IN}$ is higher than the output voltage $V_{OUT}$, the power-supply-voltage switch 16 provides the input voltage $V_{IN}$ to the power-supply line L which supplies the operation power for the circuits in the DC-DC converter 10 including the boost converter circuit 20 so as to cause the step-up operation of the boost converter circuit 20 and the operations of the circuits in the DC-DC converter 10 to be performed. When the output voltage $V_{OUT}$ is higher than the input voltage $V_{IN}$, the power-supply-voltage switch 16 provides the output voltage $V_{OUT}$ to the power-supply line L which supplies the operation power for the circuits in the DC-DC converter 10 including the boost converter circuit 20 so as to cause the step-up operation of the boost converter circuit 20 and the operations of the circuits in the DC-DC converter 10 to be performed.

The power-supply-voltage switch 16, which performs the above-described function, has a hardware arrangement including the first-conductive-type first MOSFET 161, the first-conductive-type second MOSFET 162 and a back-gate biasing circuit 164, as shown in FIG. 2. In this embodiment, each of the first-conductive-type first MOSFET 161 and the first-conductive-type second MOSFET 162 is the p-channel MOSFET, as shown in FIG. 2. The first-conductive-type first MOSFET 161 is referred to as the first p-channel MOSFET 161, and the first-conductive-type second MOSFET 162 is referred to as the second p-channel MOSFET 162.

The first p-channel MOSFET 161 is integrated in the DC-DC converter 10, and has a function of providing the input voltage $V_{IN}$ to the power-supply line L when activated (turned on) but preventing the input voltage $V_{IN}$ from being provided to the power-supply line L when deactivated (turned off). As shown in FIG. 2, the input voltage $V_{IN}$ is applied to the source of the first p-channel MOSFET 161, the drain of the first p-channel MOSFET 161 is connected to the power-supply line L and the gate of the first p-channel MOSFET 161 is connected to an output terminal of the logic circuit 142, from which terminal the first gate logic signal 142a is output.

The second p-channel MOSFET 162 is integrated in the DC-DC converter 10, and has a function of providing the output voltage $V_{OUT}$ to the power-supply line L when activated (turned on) but preventing the output voltage $V_{OUT}$ from being provided to the power-supply line L when deactivated (turned off). As shown in FIG. 2, the output voltage $V_{OUT}$ is applied to the source of the second p-channel MOSFET 162, the drain of the second p-channel MOSFET 162 is connected to the power-supply line L and the gate of the second p-channel MOSFET 162 is connected to an output terminal of the logic circuit 142, from which terminal the second gate logic signal 142b is output.

The back-gate biasing circuit 164 has the function of providing the higher voltage between the input voltage $V_{IN}$ and the output voltage $V_{OUT}$ to the back gate of the first p-channel MOSFET 161 and the back gate of the second p-channel MOSFET 162. As shown in FIG. 2, the back-gate biasing circuit 164 has a hardware arrangement including the first diode 1641 and the second diode 1642.

The first diode 1641 is integrated in the DC-DC converter 10, and, as shown in FIG. 2, the cathode of the first diode 1641 is connected to the back gate of the first p-channel MOSFET 161 and the back gate of the second p-channel MOSFET 162. Further, the input voltage $V_{IN}$ is applied to the anode of the first diode 1641. In this embodiment, the Schottky barrier diode is used as the first diode 1641. The first diode 1641 is referred to as the first Schottky barrier diode 1641.

The second diode 1642 is integrated in the DC-DC converter 10, and, as shown in FIG. 2, the cathode of the second diode 1641 is connected to the back gate of the first p-channel MOSFET 161 and the back gate of the second p-channel MOSFET 162. Further, the output voltage $V_{OUT}$ is applied to the anode of the second diode 1642. In this embodiment, the Schottky barrier diode is used as the second diode 1642. The second diode 1642 is referred to as the second Schottky barrier diode 1642.

In the back-gate biasing circuit 164 having the above-described circuit arrangement, when the input voltage $V_{IN}$ is higher than the output voltage $V_{OUT}$, the first Schottky barrier diode 1641 is activated, and, simultaneously, the second Schottky barrier diode 1642 is deactivated. Thereby, the input voltage $V_{IN}$ is applied to the back gate of the first p-channel MOSFET 161 and the back gate of the second p-channel MOSFET 162. Further, the first p-channel MOSFET 161 is activated, and, thereby, the input voltage $V_{IN}$ is provided to the power-supply line L, and, simultaneously, the second p-channel MOSFET 162 is deactivated, and, thereby, the output voltage $V_{OUT}$ is prevented from being provided to the power-supply line L.

When the output voltage $V_{OUT}$ is higher than the input voltage $V_{IN}$, the second Schottky barrier diode 1642 is activated, and, simultaneously, the first Schottky barrier diode 1641 is deactivated. Thereby, the output voltage $V_{OUT}$ is applied to the back gate of the first p-channel MOSFET 161 and the back gate of the second p-channel MOSFET 162. Further, the second p-channel MOSFET 162 is activated, and, thereby, the output voltage $V_{OUT}$ is provided to the power-supply line L, and, simultaneously, the first p-channel MOSFET 161 is deactivated, and, thereby, the input voltage $V_{IN}$ is prevented from being provided to the power-supply line L.

Figure 1:
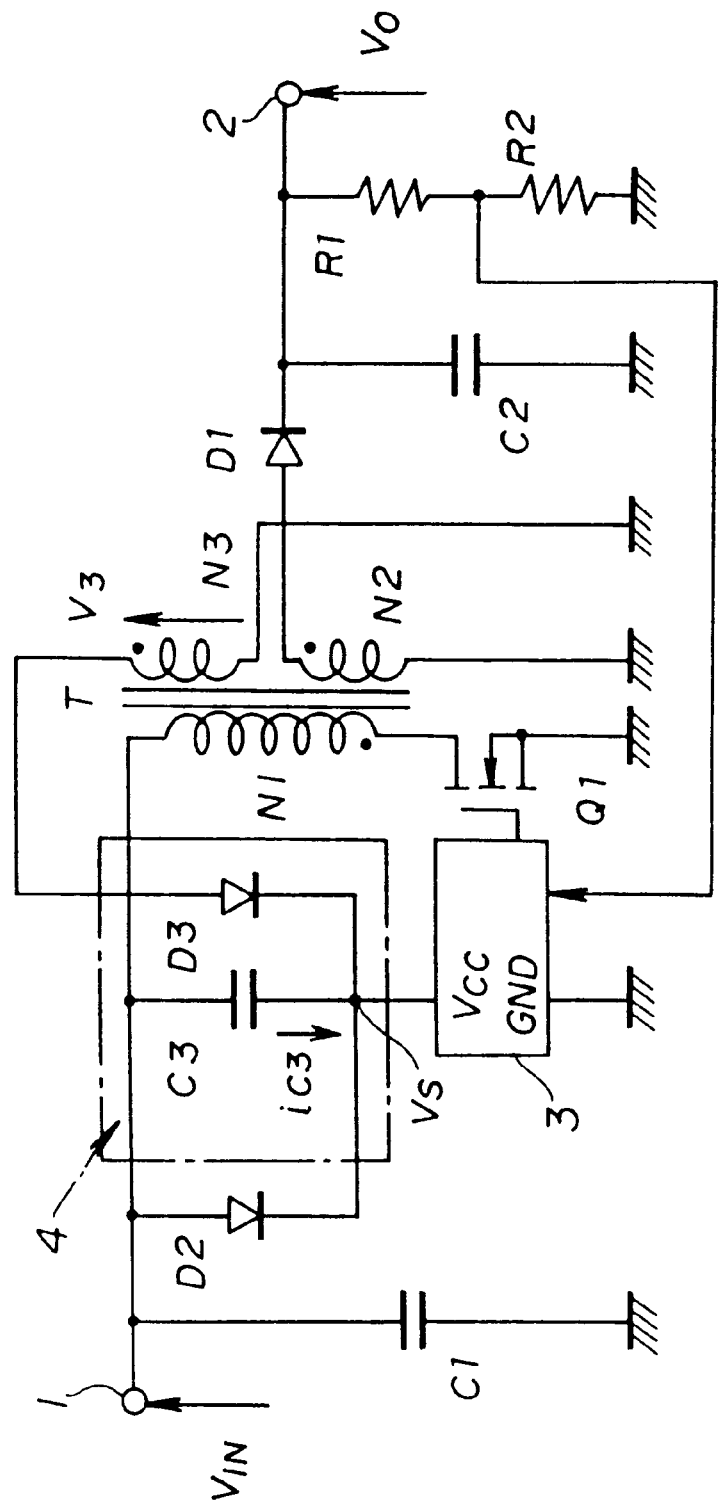
FIG. 1 shows a circuit diagram for illustrating a DC-DC converter (switching power-supply circuit)in the prior art.

Thereby, before the step-up operation is started, the input voltage $V_{IN}$ is used as the power-supply voltage Vdd of the power-supply line L which supplies the operation power to the circuits in the DC-DC converter 10 including the boost converter circuit 20. In this case, the input voltage $V_{IN}$ is provided to the power-supply line L via the first MOSFET 161. After the step-up operation is started, the output voltage $V_{OUT}$ is used as the power-supply voltage Vdd of the power-supply line L. In this case, the output voltage $V_{OUT}$ is provided to the power-supply line L via the second MOSFET 162. As a result, the case in which the power-supply voltage (of the power-supply line L) for the boost converter circuit 20, before the step-up operation is performed, is the voltage lower than the power-source voltage $V_{IN}$ by the voltage drop equal to the forward-direction dropping voltage of a diode, such as that (diode D2, shown in FIG. 1) used in the prior art, can be avoided, and the necessary boost-operation starting voltage can be reduced.

Figure 4:
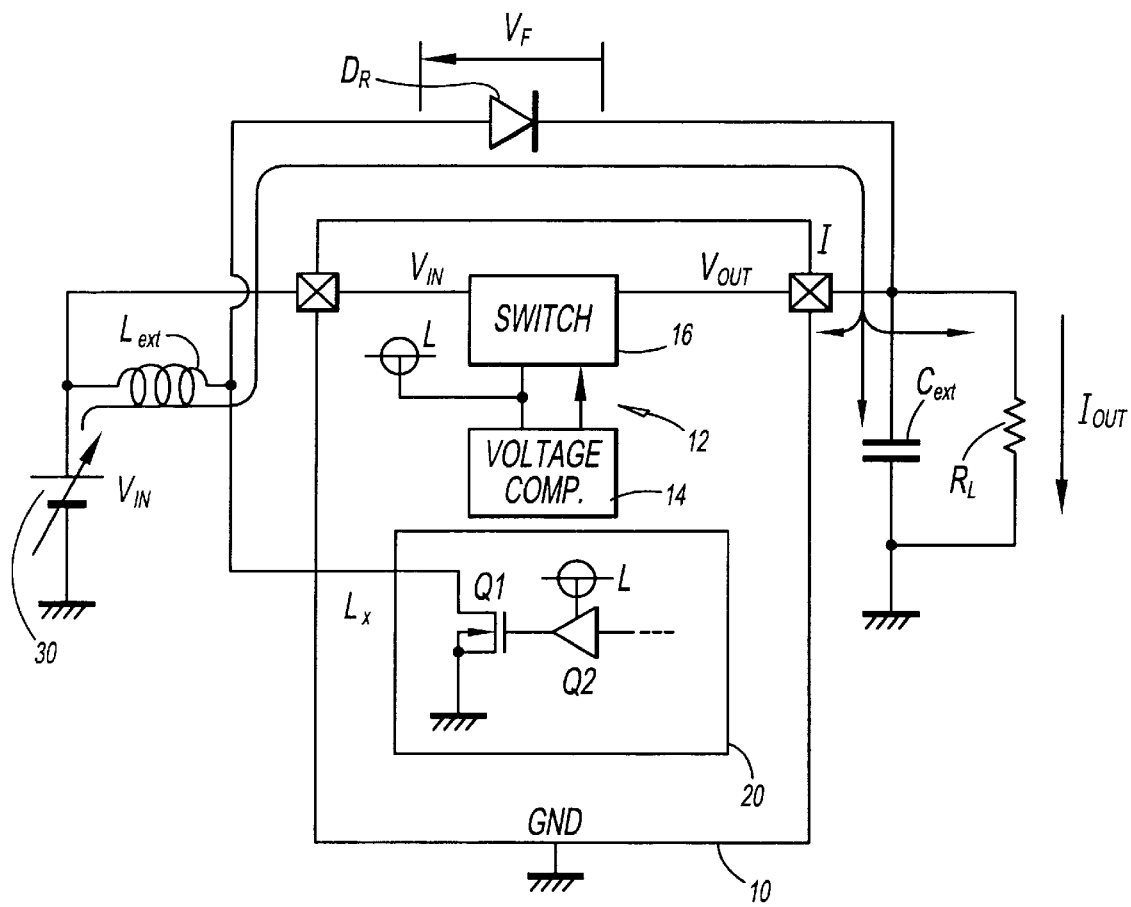
FIG. 4 shows a circuit diagram for illustrating a DC-DC converter provided with the power-supply switching portion shown in FIG. 2, and externally connected circuits.

FIG. 4 shows a circuit diagram for illustrating the DC-DC converter 10 provided with the power-supply switching portion 12 and externally connected circuits.

A diode $D_R$ for rectification, a capacitor Cext for smoothing, a reactance Lext for voltage increasing and an external power source 30 are connected externally to the DC-DC converter 10.

The plus terminal of the external power source 30 is connected to a terminal Lx of the DC-DC converter 10 via the reactance Lext.

The anode of the diode $D_R$ is connected to the terminal Lx, and the cathode of the diode $D_R$ is connected to the terminal to which the output voltage $V_{OUT}$ is applied.

The capacitor Cext and a load $R_L$ are connected between the terminal to which the output voltage $V_{OUT}$ is applied and the GND terminal having the ground electric potential GND. The GND terminal is grounded, and the electric potential of the GND terminal is connected to the ground.

An end of the reactance Lext is connected to the plus terminal of the external power source 30, and the other end of the reactance Lext is connected to the terminal Lx. Further, the anode of the diode $D_R$ and a power MOSFET $Q_1$ for driving the reactance Lext are connected to the terminal Lx. (The power MOSFET $Q_1$ is integrated in the DC-DC converter.) A driver element $Q_2$ is connected to the gate of the power MOSFET $Q_1$ A lithium battery, a Ni—Cd cell, or the like an be used as the external power source 30.

Figure 5:
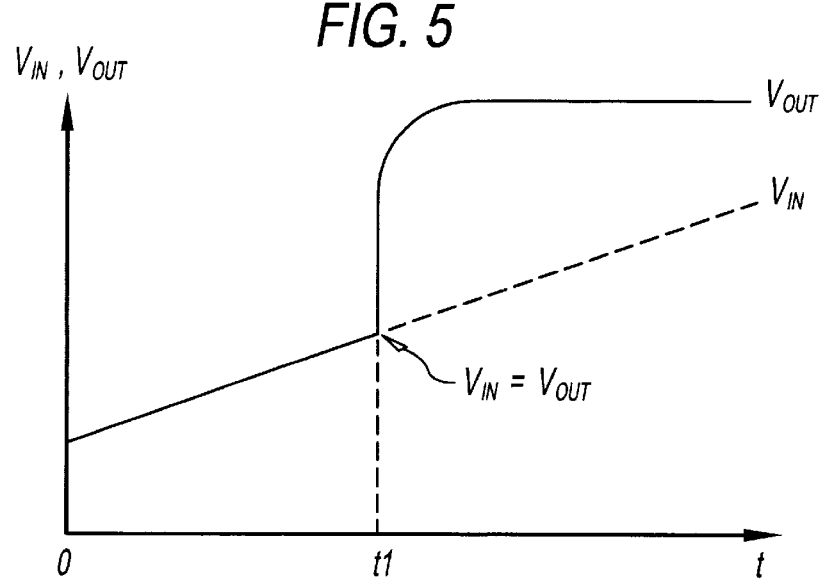
FIG. 5 shows the transient characteristic of an output voltage of the DC-DC converter shown in FIG. 4.

FIG. 5 is a graph for illustrating the transient characteristic of the output voltage $V_{OUT}$ of the DC-DC converter 10 shown in FIG. 4.

As shown in FIG. 5, in the DC-DC converter 10, the voltage values of the input voltage $V_{IN}$ and the output voltage $V_{OUT}$, after the boost converter circuit is started (t>0), are compared, and, before the step-up operation is started (0<t<$t_1$), that is, in the condition in which the input voltage $V_{IN}$ is higher than the output voltage $V_{OUT}$, the input voltage $V_{IN}$ is provided to the power-supply line L which supplies the operation power for the circuits in the DC-DC converter 10 including the boost converter circuit 20 so as to start the circuits in the DC-DC converter 10 including the boost converter circuit 20.

Before the step-up operation is started (0<t<$t_1$), energy supplied by the external source 30 is stored in the reactance Lext during the period in which the power MOSFET $Q_1$ is controlled so as to be in the turned-on state, and the energy stored in the reactance Lext is supplied to the capacitor Cext via the diode $D_R$, with which energy the capacitor Cext is charged, during the period in which the power MOSFET $Q_1$ is controlled so as to be in the turned-off state. Turning on and turning off of the power MOSFET $Q_1$ are repeated, and, thereby, the above-described operations are repeated alternately. Thereby, it is possible to generate a voltage, which voltage results from increasing the voltage $V_{IN}$ of the external power source 30, at the terminal to which the output voltage $V_{OUT}$ is applied. The energy thus stored in the capacitor Cext is supplied to the load $R_L$, and, thus, the output voltage $V_{OUT}$ is applied to the load $R_L$, and the current $I_{OUT}$ flows through the load $R_L$.

Such a voltage-increasing (boost, step-up) technique is well-known in the technical field of DC-DC converters, and the boost converter circuit 20 shown in FIG. 4 can be obtained from the well-known voltage-increasing technique. For example, Japanese Laid-Open Patent Application No. 8-280170 discloses boost converter circuits. In the disclosure of Japanese Laid-Open Patent Application No. 8-280170, each of the boost converter circuits constitutes a switching transistor 7, a voltage dividing circuit 8, a reference voltage 9 (which may be formed by a MOSFET), an oscillation circuit 10, a pulse control circuit 11, an error amplifier 12 and a starter circuit 13, shown in a respective one of FIGS. 1 and 2 of Japanese Laid-Open Patent Application No. 8-280170. Any of these boost converter circuits disclosed in Japanese Laid-Open Patent Application No. 8-280170 may be used as the boost converter circuit 20, shown in FIG. 4 of the present application. When any of the boost converter circuits disclosed in Japanese Laid-Open Patent Application No. 8-280170 is used as the boost converter circuit 20, shown in FIG. 4 of the present application, the operation power for the oscillation circuit 10, pulse control circuit 11, error amplifier 12 and starter circuit 13 of the boost converter circuit, shown in a respective one of FIGS. 1 and 2 of Japanese Laid-Open Patent Application No. 8-280170, is supplied from the power-supply line L, shown in FIG. 4 of the present application. The entire contents of Japanese Laid-Open Patent Application No. 8-280170 are hereby incorporated by reference.

Furthermore, in the DC-DC converter 10, the voltage values of the input voltage $V_{IN}$ and the output voltage $V_{OUT}$, after the boost converter circuit 20 is started (t>0), are compared, and, after the step-up operation is started (t>$t_1$), that is, in the condition in which the output voltage $V_{OUT}$ is equal to or higher than the input voltage $V_{IN}$, the output voltage $V_{OUT}$ is provided, instead of the input voltage $V_{IN}$, to the power-supply line L which supplies the operation power for the circuits in the DC-DC converter 10 including the boost converter circuit 20 so as to cause the step-up operation of the boost converter circuit 20 an d the operations of the circuits in the DC-DC converter 10 to be continuously performed.

Also after the step-up operation is started (t>$t_1$), the energy supplied by the external source 30 is stored in the reactance Lext during the period during which the power MOSFET $Q_1$ is controlled so as to be in the turned-on state, and the energy stored in the reactance Lext is supplied to the capacitor Cext via the diode $D_R$, with which energy the capacitor Cext is charged, during the period during which the power MOSFET $Q_1$ is controlled so as to be in the turned-off state. Turning on and turning off of the power MOSFET $Q_1$ are repeated, and, thereby, the above-described operations are repeated alternately. Thereby, it is possible to generate a voltage, which voltage results from increasing the voltage $V_{IN}$ of the external power source 30, at the terminal to which the output voltage $V_{OUT}$ is applied. The energy thus stored in the capacitor Cext is supplied to the load $R_L$, and, thus, the output voltage $V_{OUT}$ is applied to the load $R_L$, and the current $I_{OUT}$ flows through the load $R_L$.

Thereby, in this embodiment, before the step-up operation is started, the input voltage $V_{IN}$ is used as the power-supply voltage Vdd of the power-supply line L which supplies the operation power to the circuits in the DC-DC converter 10 including the boost converter circuit 20. After the step-up operation is started, the output voltage $V_{OUT}$ is used as the power-supply voltage Vdd of the power-supply line L. As a result, the case in which the power-supply voltage Vdd (of the power-supply line L) for the boost converter circuit 20, before the step-up operation is performed, is the voltage lower than the power-source voltage $V_{IN}$ by the voltage drop equal to the forward-direction dropping voltage of a diode, such as that (the diode D2, shown in FIG. 1) used in the prior art, can be avoided, and the necessary boost-operation starting voltage can be reduced.

Thereby, it is possible to cause the DC-DC converter 10 to operate by providing the input voltage $V_{IN}$, which voltage can be lower because the voltage drop equal to the forward-direction dropping voltage of a diode, such as that (the diode D2, shown in FIG. 1) used in the prior art, does not occur. As a result, it is possible to widen the margin of the input voltage $V_{IN}$ on the low-voltage side, and to lower the necessary lowest operation voltage.

Further, the present invention is not limited to the above-described embodiment, and variations and modifications may be made without departing from the scope of the present invention.

The present application is based on Japanese priority application No 10-205977 filed on Jul. 22, 1998, the entire contents of which are hereby incorporated by reference.

What is claimed is:

1. A DC-DC converter, provided with a boost converter circuit, which is used for increasing an input voltage to a predetermined voltage and outputting the voltage, said DC-DC converter comprising:

power-supply switching means for comparing the input voltage and an output voltage after said boost converter circuit is started, and, before a step-up operation is started, that is, in a condition in which the input voltage is higher than the output voltage, providing, via a first MOSFET, the input voltage to a power-supply line which supplies operation power for said boost converter circuit so as to start said boost converter circuit, and, after the step-up operation is started, that is, in a condition in which the output voltage is equal to or higher than the input voltage, providing, via a second MOSFET, the output voltage, instead of the input voltage, to the power-supply line which supplies the operation power for said boost converter circuit so as to cause the step-up operation of said boost converter circuit to be continuously performed; and back-gate biasing means providing the higher voltage between the input voltage and the output voltage to a back gate of said first MOSFET and a back gate of said second MOSFET.

2. The DC-DC converter as claimed in claim 1, wherein said power-supply switching means comprises:

voltage comparing means for comparing the voltage values of the input voltage and the output voltage, after the boost converter circuit is started, so as to generate a switching signal; and power-supply-voltage switching means for, based on the switching signal, providing the higher voltage between the input voltage and the output voltage to the power-supply line which supplies the operation power for said boost converter circuit so as to cause the step-up operation of the boost converter circuit to be performed.

3. The DC-DC converter as claimed in claim 2, wherein said power-supply-voltage switching means comprises:

said first MOSFET providing the input voltage to the power-supply line when activated but preventing the input voltage from being provided to the power-supply line when deactivated; and said second MOSFET providing the output voltage to the power-supply line when activated but preventing the output voltage from being provided to the power-supply line when deactivated.

4. The DC-DC converter as claimed in claim 3, wherein said back-gate biasing circuit comprises:

a first diode, the cathode of which is connected to said back gate of said first MOSFET and said back gate of said second MOSFET, the input voltage being applied to the anode of said first diode; and a second diode, the cathode of which is connected to said back gate of said first MOSFET and said back gate of said second MOSFET, the output voltage being applied to the anode of said second diode;

wherein, when the input voltage is higher than the output voltage, said first diode is activated, and, simultaneously, said second diode is deactivated, thereby the input voltage being applied to said back gate of said first MOSFET and said back gate of said second MOSFET; and when the output voltage is higher than the input voltage, said second diode is activated, and, simultaneously, said first diode is deactivated, thereby the output voltage being applied to said back gate of said first MOSFET and said back gate of said second MOSFET.

5. The DC-DC converter as claimed in claim 2, wherein said voltage comparing means comprises a logic circuit which, when the input voltage is higher than the output voltage, applies, to the gate of said first MOSFET, as the switching signal, a first gate signal having a signal level such as to activate said first MOSFET, and, also, applies, to the gate of said second MOSFET, as the switching signal, a second gate signal having a signal level such as to deactivate said second MOSFET, and, when the output voltage is higher than the input voltage, applies, to said gate of said second MOSFET, as the switching signal, the second gate signal having a signal level such as to activate said second MOSFET, and, also, applies, to said gate of said first MOSFET, as the switching signal, the first gate signal having a signal level such as to deactivate said first MOSFET.

6. A DC-DC converter, provided with a boost converter circuit, which is used for increasing an input voltage to a predetermined voltage and outputting the voltage, said DC-DC converter comprising:

power-supply switching portion which compares the input voltage and an output voltage after said boost converter circuit is started, and, before a step-up operation is started, that is, in a condition in which the input voltage is higher than the output voltage, provides, via a first MOSFET, the input voltage to a power-supply line which supplies operation power for said boost converter circuit so as to start said boost converter circuit, and, after the step-up operation is started, that is, in a condition in which the output voltage is equal to or higher than the input voltage, provides, via a second MOSFET, the output voltage, instead of the input voltage, to the power-supply line which supplies the operation power for said boost converter circuit so as to cause the step-up operation of said boost converter circuit to be continuously performed; and back-gate biasing circuitry providing the higher voltage between the input voltage and the output voltage to a back gate of said first MOSFET and a back gate of said second MOSFET.

7. The DC-DC converter as claimed in claim 6, wherein said power-supply switching portion comprises:

a voltage comparing portion which compares the voltage values of the input voltage and the output voltage, after the boost converter circuit is started, so as to generate a switching signal; and a power-supply-voltage switch which, based on the switching signal, provides the higher voltage between the input voltage and the output voltage to the power-supply line which supplies the operation power for said boost converter circuit so as to cause the step-up operation of said boost converter circuit to be performed.

8. The DC-DC converter as claimed in claim 7, wherein said power-supply-voltage switch comprises:

said first MOSFET providing the input voltage to the power-supply line when activated but preventing the input voltage from being provided to the power-supply line when deactivated; and said second MOSFET providing the output voltage to the power-supply line when activated but preventing the output voltage from being provided to the power-supply line when deactivated.

9. The DC-DC converter as claimed in claim 8, wherein said back-gate biasing circuit comprises:

a first diode, the cathode of which is connected to said back gate of said first MOSFET and said back gate of said second MOSFET, the input voltage being applied to the anode of said first diode; and a second diode, the cathode of which is connected to said back gate of said first MOSFET and said back gate of said second MOSFET, the output voltage being applied to the anode of said second diode;

wherein, when the input voltage is higher than the output voltage, said first diode is activated, and, simultaneously, said second diode is deactivated, thereby the input voltage being applied to said back gate of said first MOSFET and said back gate of said second MOSFET; and when the output voltage is higher than the input voltage, said second diode is activated, and, simultaneously, said first diode is deactivated, thereby the output voltage being applied to said back gate of said first MOSFET and said back gate of said second MOSFET.

10. The DC-DC converter as claimed in claim 7, wherein said voltage comparing portion comprises a logic circuit which, when the input voltage is higher than the output voltage, applies, to the gate of said first MOSFET, as the switching signal, a first gate signal having a signal level such as to activate said first MOSFET, and, also, applies, to the gate of said second MOSFET, as the switching signal, a second gate signal having a signal level such as to deactivate said second MOSFET, and, when the output voltage is higher than the input voltage, applies, to said gate of said second MOSFET, as the switching signal, the second gate signal having a signal level such as to activate said second MOSFET, and, also applies, to said gate of said first MOSFET, as the switching signal, the first gate signal having a signal level such as to deactivate said first MOSFET.

11. A power-supply switching circuit comprising:

a comparator for comparing an input voltage to an output voltage and outputting a result of the comparison;

a first MOSFET for supplying the input voltage to a power-supply line when the result of the comparison indicates that the input voltage is greater than the output voltage;

a second MOSFET for supplying the output voltage to the power-supply line when the result of the comparison indicates that the output voltage is equal to or greater than the input voltage; and a back-gate biasing circuit for providing the input voltage or the output voltage, which ever is greater, to a back-gate of the first MOSFET and a back-gate of the second MOSFET.

12. A power-supply switching circuit as recited in claim 11, wherein the back-gate biasing circuit comprises:

a first diode, a cathode of the first diode being connected to the back-gate of the first MOSFET and the back-gate of the second MOSFET, an anode of the first diode being connected to the input voltage; and a second diode, a cathode of the second diode being connected to the back-gate of the first MOSFET and the back-gate of the second MOSFET, an anode of the second diode being connected to the output voltage.

13. A power-supply switching circuit as recited in claim 12, wherein, when the input voltage is greater than the output voltage, the first diode is activated, and the second diode is deactivated, and when the output voltage is greater than the input voltage, the second diode is activated, and the first diode is deactivated.

14. A power-supply switching method comprising steps of:

comparing an input voltage to an output voltage and outputting a result of the comparison;

supplying the input voltage to a power-supply line via a first MOSFET when the result of the comparison indicates that the input voltage is greater than the output voltage;

supplying the output voltage to the power-supply line via a second MOSFET when the result of the comparison indicates that the output voltage is equal to or greater than the input voltage; and selectively providing the input voltage or the output voltage, which ever is greater, to a back-gate of the first MOSFET and a back-gate of the second MOSFET.

* * * * *